United States Patent Office 3,152,966
Patented Oct. 13, 1964

3,152,966
METHOD FOR PRODUCING INOSINIC ACID AND ADENYLIC ACID BY FERMENTATION
Shukuo Kinoshita, Shibuya-ku, Tokyo, Shigeo Abe, Suginami-ku, Tokyo, Kiyoshi Udagawa, Tsurumi-ku, Yokohama, Takeshi Saito, Sagamihara-shi, and Kenichiro Takayama, Setagaya-ku, Tokyo, Japan, assignors to Kyowa Hakko Kogyo Co., Ltd., Tokyo, Japan, a corporation of Japan
No Drawing. Filed Mar. 9, 1962, Ser. No. 178,580
Claims priority, application Japan Mar. 11, 1961
5 Claims. (Cl. 195—28)

The present invention relates to a method for producing inosinic acid and adenylic acid by fermentation. According to this invention inosinic and adenylic acid are produced by culturing biochemical mutant strains of microorganisms in culturing media containing (a) saccharides or other carbon sources, (b) nitrogen sources, (c) inorganic substances, (d) organic substances and (e) other nutrients necessary for the microorganisms, whereby, the 5'-inosinic acid (inosine-5'-phosphate), 5'-adenylic acid (adenosine-5'-phosphate) and 3'-adenylic acid (adenosine-3'-phosphate) are directly produced and accumulated either singly or in combination in the media. In further accord with this invention, the acids produced are isolated and separately recovered.

An object of the invention is to provide a novel method for producing inosinic acid and adenylic acid by fermentation. Other objects will be apparent as the description proceeds.

Nucleic acid comprises a chain of repeating units, each of which is built up from a sugar, a purine or pyrimidine base, and phosphoric acid. A given nucleic acid contains either (but not both) D-ribose or 2-desoxy-D-ribose as the sugar. Ribonucleic acid (RNA) is a nucleic acid containing ribose. Desoxyribonucleic acid (DNA) is a nucleic acid containing 2-desoxy-D-ribose. Genetic control of cellular reproduction is imputed to proteins containing DNA. Inosinic and adenylic acid are building blocks in the structures of RNA and DNA and therefore can be used as intermediates in nucleic acid synthesis.

In addition, 3'-adenylic acid (yeast adenylic acid)

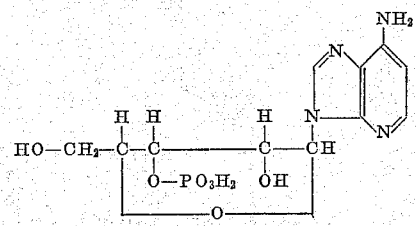

gives a quantitative yield of furfural when distilled with 20% HCl for three hours.

5'-adenylic acid (muscle adenylic acid)

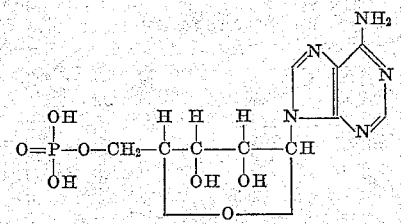

is readily deaminated by nitrous acid with the formation of inosinic acid. The muscle tissue preparation may be used for the treatment of bursitis, tendinitis, phlebothrombosis and pruritis. (Burger, Alfred, "Medicinal Chemistry," Interscience Publishers, Inc., New York, second edition, 1960, page 533; "The Merck Index of Chemicals and Drugs," Merck & Co., Inc., seventh edition, 1960, page 22.)

Inosinic acid

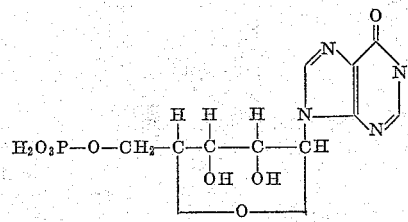

hydrolyzes (on boiling with acid) to one mole of each of $H_3PO_4$, D-ribose and hypoxanthine.

Each of the above-identified acids, 3'- and 5'-adenylic acid and inosinic acid, may be used to enhance the flavor of food, to impart a good taste to food, as a condiment.

The microorganisms within the contemplation of this invention are biochemical mutant strains requiring at least one of the substances:

Guanine            Thymine
Hypoxanthine       Xanthine for their growth. Microorganisms having this genetic characteristic accumulate inosinic acid and adenylic acid in their culture broths or in their cell bodies. The fact that a microorganism may require one or more additional substances for growth does not adversely affect the property of acid production according to the present invention as long as one or a combination of the above-enumerated substances is required for the growth of the microorganism. The present invention is not limited to particular genera or groups of genera of microorganisms. The sole critical characteristic of the microorganism is that defined above. The culturing of any microorganism requiring for growth at least one (or a combination) of the stated substances is within the scope of this invention.

A large number of such biochemical mutant strains are obtained by irradiation of ultraviolet ray, γ-ray or X-ray, or by treatment with chemical agents of diverse microorganisms which ordinarily do not require guanine, xanthine, hypoxanthine or thymine for growth. Among microorganisms which can be appropriately modified to come within the contemplation of this invention are those of the genera:

Micrococcus, e.g., *Micrococcus glutamicus*
Bacillus, e.g., *Bacillus subtilis*
Escherichia, e.g., *Escherichia coli*
Brevibacterium, e.g., *Brevibacterium ammoniagenes*
Candida, e.g., *Candida utilis*
Penicillium, e.g., *Penicillium chrysogenum*
Aspergillus, e.g., *Aspergillus niger*
Streptomyces, e.g., *Streptomyces griseus*
Neurospora, e.g., *Neurospora crassa*

Although the exemplified species include mutants which do not accumulate practical quantities of inosinic and adenylic acids, those mutants which require at least one of the substances, guanine, xanthine, hypoxanthine and thymine, for growth accumulate (upon fermentation) inosinic acid and/or adenylic acid.

Up to date, however, exact mechanisms for the accumulations of adenosine-3'-phosphate, inosinic acid, or adenosine-5'-phosphate are not yet known.

Of the exemplified biochemical mutants, *Micrococcus glutamicus* mutants requiring guanine, xanthine, hypoxanthine, or thymine (or a combination of these substances) can accumulate concurrently a remarkable amount of L-glutamic acid.

Any synthetic or natural culture medium may be employed according to the present invention as long as it contains a carbon source, e.g., a saccharide such as glucose;

a nitrogen source, e.g., an organic nitrogen source such as NZ-amine or an inorganic nitrogen source such as ammonium sulfate; inorganic substance, such as $KH_2PO_4$, $K_2HPO_4$ and $MgSO_4 \cdot 7H_2O$; organic substance, such as guanine, xanthine, hypoxanthine or thymine; and other nutrients, such as biotin. The carbon and nitrogen sources may be any of the known sources which are assimilable by the employed strain.

Carbon sources include various carbohydrates, such as glucose, glycerol, fructose, sucrose, maltose, mannitol, xylose, galactose, lactose, ribose, starch and its hydrolysates, molasses, etc. The concentration of the carbon source is ordinarily from 1 to 20% by weight (calculated as glucose) based on the volume of the medium. Also, various organic acids, such as gluconic acid, pyruvic acid, fumaric acid, lactic acid, acetic acid, formic acid; various amino acids, such as glycine, glutamic acid, alanine; and other organic substances, such as glutamine, may be employed.

Nitrogen sources include ammonia; various inorganic ammonium salts, such as ammonium chloride, ammonium phosphate, ammonium sulfate, amonium nitrate, ammonium carbonate, ammonium acetate; various nitrogenous organic substances, such as urea, peptone, NZ-amine, meat extract, yeast extract, corn steep liquor, casein hydrolysate, fish meal and its digested product, defatted soy bean and its digested product, chrysalis hydrolysate; and amino acids, such as glycine, glutamic acid, and alanine.

When a medium containing guanine, xanthine, hypoxanthine and/or thymine is employed, guanine, xanthine, hypoxanthine, and/or thymine (including derivatives and RNA, DNA, etc.), or a material containing these substances, should be added to the medium so that the amount of each substance required for the mutant strain employed is 2 to 90 $\mu g./ml.$ Thus, the total amount in the medium of each substance (as guanine, xanthine, hypoxanthine, or thymine) required for the growth of the mutant strain employed is desirably such that the effective amount provides a concentration of from 2 to 90 $\mu g./ml.$ If the amount is in excess, the accumulation of inosinic acid and/or adenylic acid is markedly reduced, though the growth of the microorganism is accelerated. Thus an important condition of the inventive fermentation (to obtain optimum yields of inosinic and/or adenylic acids) is that the concentration in the medium of said substance(s) required for growth of the microorganism employed (guanine, xanthine, hypoxanthine and/or thymine) is suboptimum for the growth of said microorganism.

The inorganic substances employed include dipotassium hydrogen-phosphate, potassium dihydrogen-phosphate, magnesium sulfate, calcium carbonate, sodium borate, copper sulfate, iron sulfate, manganese chloride, ammonium molybdate and zinc sulfate.

When a mutant strain having concurrently a further nutritional requirement, i.e., in addition to guanine, xanthine, hypoxanthine and/or thymine, is cultured, the substance which fulfils the further requirement for growth is added to the medium.

The fermentation, according to the present invention, is effected under aerobic conditions, such as by shaking culture or submerged culture with aeration-agitation. The culturing temperature is preferably from 20° to 40° C. The control of pH of the medium while culturing the microorganism is exceedingly important. The pH of the medium tends to vary upon commencement of the fermentation. It is desirable to adjust and maintain the pH at 6.0 to 7.4 (during cultivation) with a suitable neutralizing agent in order to obtain a higher yield.

As the neutralizing agents, aqueous ammonia, sodium hydroxide, ammonium carbonate, calcium carbonate, etc., may be used. In some cases in which the strain used has urease, neutralization may be accomplished by the addition of urea. A culturing period of 2 to 6 days is ordinarily required with bacteria and yeasts, whereas 4 to 10 days' cultivation of fungi and Streptomyces may be necessary before a substantial amount of inosinic acid and/or adenylic acids is formed and accumulated in the medium or in the cell bodies.

After the completion of the culture, the cell bodies are removed, and inosinic acid and adenylic acids are recovered from the fermentation liquor by an ion-exchange resin treatment, such as that of Example 1, or by other known ion-exchange resin treatments, adsorption methods, percipitation methods or extraction processes.

The present invention is described in more detail in the following examples, which are, however, set forth merely by way of illustration and not by way of limitation. In fact, they can be modified in various ways, well known to those versed in the art, without deviation from the spirit or the scope of the invention as mentioned in the specification and the appended claims.

*Example 1*

The media employed in the present example are as follows.

Medium A:

| | |
|---|---|
| Glucose | g—— 20 |
| Peptone | g—— 10 |
| Meat extract | g—— 5 |
| Yeast extract | g—— 5 |
| NaCl | g—— 2.5 |
| Biotin | $\mu g$—— 10 | make up to one liter with water; pH being adjusted at 7.0 with N NaOH before the sterilization.

Medium B:

| | |
|---|---|
| Glucose | g—— 50 |
| $(NH_4)_2SO_4$ | g—— 15 |
| $KH_2PO_4$ | g—— 5.0 |
| $K_2HPO_4$ | g—— 5.0 |
| $MgSO_4 \cdot 7H_2O$ | g—— 0.25 |
| Guanine | mg—— 5 |
| Xanthine | mg—— 5 |
| Biotin | $\mu g$—— 1 | make up to one liter with water; pH being adjusted at 7.4 before the sterilization: After the sterilization $CaCO_3$, which has been separately sterilized, is added to the solution in amount of 10 g. per liter. A 30 ml. of the media is dividedly added to a 250 ml.-Erlenmeyer's flask, and used after sterilization.

*Micrococcus glutamicus* No. A–101, which is a xanthine-guanine-biotin requiring mutant (ATCC No. 14620, deposited at American Type Culture Collection, on March 2, 1962), is inoculated in the medium A and cultured at 28° C. for 24 hours. *Micrococcus glutamicus* No. A–101 is obtained from *Micrococcus glutamicus* ATCC 13032 by ultraviolet-ray irradiation and isolated by a selection method. Then, a 3 ml. of the cultured medium is inoculated to the medium B, and incubated for 72 hours. After that time, the accumulations of 1200 $\mu g./ml.$ of 5′-inosinic acid, and 550 and 820 $\mu g./ml.$ of 3′- and 5′-adenylic acids, respectively, as well as accumulation of L-glutamic acid at the same time, are observed. In the cell bodies also, inosinic acid and adenylic acid are accumulated. The cell bodies and insoluble $CaCO_3$ are removed from the fermented liquor by filtration and resulting filtrate is adjusted to pH 8.2 by addition of barium hydroxide and then to pH 9.0 by addition of sodium hydroxide to remove phosphoric acid and other impurities. The supernatant liquid is passed through a column filled with a strongly basic anion exchange, for example, dimethyl ethanol benzyl ammonium OH type (Dowex 2 OH type) to adsorb inosinic acid and adenylic acid. After washing the resin with water, the adsorbed inosinic acid and adenylic acid are eluted with a mixed solution containing formic acid and ammonium formate in 0.5 N and 0.25 N concentrations, respectively, and each fraction containing 5′-inosinic acid, 3′-adenylic acid, or 5′-adenylic acid, are recovered. The fractions containing the same compound are combined together, and each of the combined fractions is added with barium hydroxide to precipitate the impurities, followed by filtration of the impurities. Concentration and cooling of the filtrates give crude crystalline barium salts of each acid. The yields are 1.5 g. of 5'-inosinic acid, 780 mg. of 3'-adenylic acid, and 910 mg. of 5'-adenylic acid. The barium salt is treated with $H_2SO_4$ to produce barium sulfate which is filtered or centrifuged off. The obtained liquor is further concentrated and added with ethanol thereby to precipitate nucleotides in the free acid form. These barium salts can be converted to the sodium salts by treatment with $Na_2SO_4$. The resulting products are proved to be sodium salts of 5'-inosinic acid, 3'-adenylic acid and 5'-adenylic acid, from the data of their elemental analyses, the analyses of the contents of base, sugar, ribose, and phosphoric acid, the periodic acid oxidations, optical rotation, and the ultraviolet absorption spectra.

*Example 2*

*Micrococcus glutamicus* No. A-645 (ATCC No. 14619, deposited at American Type Culture Collection, on March 2, 1962), which is a hypoxanthine-biotin requiring mutant is used. *Micrococcus glutamicus* No. A-645 is obtained from *Micrococcus glutamicus* ATCC 13032 by ultraviolet-ray irradiation and isolated by a selection method. The pH of the medium is kept at about 6.0 during the incubation by addition of a urea solution. The fermentation medium used has a composition of 3% (weight percent based on the volume of the medium) of glucose, 1% of $(NH_4)_2SO_4$, 0.2% of $KH_2PO_4$, 0.2% of $K_2HPO_4$, 0.3% of corn steep liquor, and 25 mg./l. of hypoxanthine. The pH is controlled to 7.2 before sterilization. Other conditions are same as in Example 1. During the cultivation, pH is controlled in such a manner that, after 10 hours, 0.2-0.5 ml. of a 10% aqueous urea solution is added at every hour totaling to 5.2 ml. of the solution. After 76 hours cultivation, 1.2 mg./ml. of 5'-inosinic acid, 300 μg./ml. of 3'-adenylic acid, and 640 μg./ml. of 5'-adenylic acid are accumulated.

*Example 3*

Using *Escherichia coli* No. A-981 (ATCC No. 14621, deposited at American Type Culture Collection, on March 2, 1962), which is a thymine-requiring mutant and is obtained from *Escherichia coli* K-12 (obtained from Dr. F. J. Rayan of Columbia University) by a $HNO_2$— treatment and isolated by a selection method, and keeping the pH of the medium approximately at 6.0 by addition, if necessary, of potassium hydroxide, and other procedures of Example 1 are repeated. During the cultivation, after about 10 hours, 2-3 drops (0.1-0.15 ml.) of 1 N KOH solution is added about every 3 hours, totalling to 3.4 ml. to control the pH. After 76 hours' cultivation, 1.8 mg./ml. of 5'-inosinic acid, 220 μg./ml. of 3'-adenylic acid, and 780 μg./ml. of 5'-adenylic acid are accumulated. The medium employed for the seed culture is the same as the medium A in Example 1, excepting that no biotin is added. The fermentation medium employed contains 5% (weight percent based on the volume of the medium) of maltose, 1.5% of $(NH_4)_2SO_4$, 0.1% of $KH_2PO_4$, 0.1% of $K_2HPO_4$, 0.2% of corn steep liquor, 0.1% of peptone, and 20 mg./l. of thymine, which is adjusted to pH 7.4 and sterilized before use.

*Example 4*

*Bacillus subtilis* No. A-1625 (ATCC No. 14617, deposited at American Type Culture Collection on March 2, 1962), which is a xanthineguanine-isoleucine-requiring mutant, is inoculated to a seed medium containing 2% (weight percent based on the volume of the medium) of glucose, 1% of meat extract, 0.5% of yeast extract, 1.0% of peptone, and 0.3% of NaCl, and adjusted to pH 7.0 *Bacillus subtilis* No. A-1625 is obtained from *Bacillus subtilis* Marburg strain (obtained from Dr. D. M. Bonner of Yale University) by an ultraviolet ray irradiation and isolated by a selection method. The fermentation medium contains 5% of glucose, 0.1% of $KH_2PO_4$, 0.1% of $K_2HPO_4$, 0.03% of $MgSO_4 \cdot 7H_2O$, 0.05% of NZ-amine, 0.05% of glycine, 0.02% of aspartic acid, 0.02% of glutamic acid, 0.01% of glutamine, 0.3% of fumaric acid 0.01% of formic acid, 0.0005% of p-aminobenzoic acid, 0.0002% of folic acid, 25 μg./ml. of guanine, 20 μg./ml. of xanthine, and 3μg./ml. of isoleucine, which is adjusted to pH 7.4 and sterilized before use. After 76 hours, cultivation as in Example 1, 2.2 mg./ml. of 5'-inosinic acid, 320 μg./ml. of 3'-adenylic acid, and 965 μg./ml. of 5'-adenylic acid are accumulated. If glycine, aspartic acid, glutamine, fumaric acid, formic acid, p-aminobenzoic acid, biotin, and folic acid are not added to the fermentation medium, the accumulations of inosinic acid and adenylic acid are reduced to a half amount.

*Example 5*

Using *Bacillus subtilis* No. A-1203 (ATCC No. 14618, deposited at American Type Culture Collection on March 2, 1962), which is a hypoxanthine-thymine-isoleucine-requiring mutant, a cultivation is the same as in Example 4. The *Bacillus subtilis* No. A-946 is obtained from *Bacillus subtilis* Marburg strain (obtained from Dr. D. M. Bonner of Yale University) by an ultraviolet ray irradiation and isolated by a selection method. Fermentation medium used is the same as in Example 4 except that xanthine and guanine are replaced by 20 μg./ml. of hypoxanthine and 20 μg./ml. of thymine. After 82 hours cultivation, 1.6 mg./ml. of 5'-inosinic acid, 600 μg./ml. of 3'-adenylic acid, and 1.0 mg./ml. of 5'-adenylic acid are accumulated.

*Example 6*

Using *Aspergillus niger* No. A-946, which is a guanine-isoleucine-requiring mutant, a cultivation is carried out, meanwhile the pH of the culture liquor is kept 6.2, by adding a urea solution timely and the other conditions are the same as in Example 4 except that, in the fermentation medium, xanthine is omitted. *Aspergillus niger* No. A-946 is obtained from *Aspergillus niger* NRRL 337 by a $Co^{60}$ γ-ray irradiation and isolated by a selection method. After 10 hours from beginning of the cultivation, each of 0.2-0.5 ml. of a 1 N NaON solution and a 10% aqueous urea solution are added at every 4-5 hours, totalling respectively to 3.6 ml. and 4.8 ml., to control the pH. After 6 days, 360 μg./ml. of 5'-inosinic acid, 230 μg./ml. of 3'-adenylic acid, and 260 μg./ml. of 5'-adenylic acid are accumulated.

*Example 7*

Using *Candida utilis* No. A-446, which is a xanthine-leucine-requiring mutant, adding urea and sodium hydroxide to keep pH 6.6, and employing the same procedures as in Example 4 except that, in the fermentation medium, guanine and isoleucine are omitted and 5 μg./ml. of leucine is added, a cultivation is carried out. The *Candida utilis* No. A-446 is obtained from *Candida utilis* IAM (Institute of Applied Micro-biology of University of Tokyo) TH-9 by a $Co^{60}$ γ-ray irradiation and isolated by a selection method. During the cultivation, after 18 hours, a 10% urea solution and 1 N NaOH solution are added in respective amounts of 0.3-0.5 ml. and 2-3 drops (0.1-0.15 ml.) at every 4-7 hours, totalling to 4.7 ml. and 4.6 ml., respectively, to control the pH. After 6 days cultivation, 360 μg./ml. of 5'-inosinic acid, 230 μg./ml. of 3'-adenylic acid, and 260 μg./ml. of 5'-adenylic acid are accumulated.

*Example 8*

*Micrococcus glutamicus* No. A-645 is used. The medium is made of glucose 20 g., peptone 10 gr. yeast extract 2 g., sodium chloride 2 g. and biotin 10 μg./l. and made up 1 l. with water. 10 ml. each of the medium (pH 7) is poured into test tubes and sterilized at 120°

C. for 10 min. The micro-organism is inoculated to the medium, shaking cultured at 28° C. for 24 hours, and the culture is used as a seed in the following fermentation. The fermentation medium employed contains glucose 50 g., $KH_2PO_4$ 10 g., $K_2HPO_4$ 10 g., $(NH_4)_2SO_4$ 10 g., $MgSO_4 \cdot 7H_2O$ 0.3 g., peptone 0.1 g., yeast extract 3 g., corn steep liquor 1 g., and sodium citrate 0.5 g. in one liter of water, the pH being adjusted to 7.2. To 30 ml. each of another medium poured into 300 ml. Erlenmyer flasks and sterilized at 120° C. for 10 minutes, are added 0.6 g. of $CaCO_3$ each. The seed culture is inoculated to the fermentation medium at the rate of 10% by volume and clutured for 72 hours, with the result that 3.8 mg./ml. of 5'-inosinic acid is formed.

Example 9

Example 8 is repeated with *Micrococcus glutamicus* No. A–645, with the result of forming 4.6 mg./ml. of 5'-inosinic acid and 1.2 mg./ml. of 5-adenylic acid.

Example 10

Example 8 is repeated using *Bacillus subtilis* No. A–1625, using the result of formation of 4.5 mg./ml. of 5'-inosinic acid and 0.8 mg./ml. of 3'-adenylic acid.

Example 11

Example 8 is repeated using *Escherichia coli* No. A–981, with the result of formation of 2.5 mg./ml. 5'-inosinic acid.

Examples 12–22

The parent strains are clutured as in the same ways mentioned in respective foregoing examples. Neither inosinic acid nor adenylic acid is produced.

What we claim is:

1. A fermentation method which comprises (a) aerobically culturing *Micrococcus glutamicus* (ATCC 14620) under fermentation conditions in a fermentation medium containing carbon source, nitrogen source, biotin and from 2 to 90 micrograms per milliliter each of xanthine and guanine; whereby at least one substance selected from the group consisting of 5'-inosinic acid, 3'-adenylic acid and 5'-adenylic acid, is directly produced and accumulated; (b) isolating the produced and accumulated substance in a form selected from the group consisting of the free acid and a salt thereof; and (c) recovering from said medium each substance so produced and accumulated.

2. A fermentation method which comprises (a) aerobically culturing *Micrococcus glutamicus* (ATCC 14619) under fermentation conditions in a fermentation medium containing carbon source, nitrogen source, biotin and from 2 to 90 micrograms per milliliter of hypoxanthine, whereby at least one substance selected from the group consisting of 5'-inosinic acid, 3'-adenylic acid and 5'-adenylic acid is directly produced and accumulated; (b) isolating the produced and accumulated substance in a form selected from the group consisting of the free acid and a salt thereof; (c) recovering from said medium each substance so produced and accumulated.

3. A fermentation method which comprises (a) aerobically culturing *Escherichia coli* (ATCC 14621) under fermentation conditions in a fermentation medium containing carbon source, nitrogen source and from 2 to 90 micrograms per milliliter of thymine, whereby at least one substance selected from the group consisting of 5'-inosinic acid, 3'-adenylic acid and 5'-adenylic acid is directly produced and accumulated; (b) isolating the produced and accumulated substance in a form selected from the group consisting of the free acid and a salt thereof; and (c) recovering from said medium each substance so produced and accumulated.

4. A fermentation method which comprises (a) aerobically culturing *Bacillus subtilis* (ATCC 14617) under fermentation conditions in a fermentation medium containing carbon source, nitrogen source, isoleucine and from 2 to 90 micrograms per milliliter each of xanthine and guanine, whereby at least one substance selected from the group consisting of 5'-inosinic acid, 3'-adenylic acid and 5'-adenylic acid is directly produced and accumulated; (b) isolating the produced and accumulated substance in a form selected from the group consisting of the free acid and a salt thereof; and (c) recovering from said medium each substance so produced and accumulated.

5. A fermentation method which comprises (a) aerobically culturing *Bacillus subtilis* (ATCC 14618) under fermentation conditions in a fermentation medium containing carbon source, nitrogen source, isoleucine and from 2 to 90 micrograms per milliliter each of hypoxanthine and thymine, whereby at least one substance selected from the group consisting of 5'-inosinic acid, 3'-adenylic acid and 5'-adenylic acid is directly produced and accumulated; (b) isolating the produced and accumulated substance in a form selected from the group consisting of the free acid and a salt thereof; and (c) recovering from said medium each substance so produced and accumulated.

References Cited in the file of this patent

Journal of Biological Chemistry 235, 1474–1478 (I), 2103–2108, (II), 2672–2681 (III) (1960), QP501 J7.